United States Patent [19]

Price

[11] 4,300,496
[45] Nov. 17, 1981

[54] ATMOSPHERE EXCLUSION HOOD MEANS FOR INTERNAL COMBUSTION MOTORS OF PORTABLE RESCUE TOOLS AND RELATED EQUIPMENT AND THE LIKE

[76] Inventor: Robert A. Price, 1119 Wilson Rd., Edgewater, Md. 21037

[21] Appl. No.: 218,359

[22] Filed: Dec. 19, 1980

Related U.S. Application Data

[63] Continuation-in-part of Ser. No. 70,359, Aug. 28, 1979, abandoned.

[51] Int. Cl.³ .............................................. F02B 77/00
[52] U.S. Cl. ............................. 123/198 E; 123/198 R; 30/122; 128/202.13
[58] Field of Search ........... 123/198 D, 195 C, 198 E, 123/198 R; 128/202.13; 30/122

[56] References Cited

U.S. PATENT DOCUMENTS 1,040,311 10/1912 Halloran ......................... 128/202.13
4,188,935 2/1980 Tubesing .............................. 30/122
4,215,665 8/1980 Stambaugh ..................... 123/198 E

FOREIGN PATENT DOCUMENTS 1004291 11/1951 France ............................ 128/202.13
283833 1/1971 U.S.S.R. ......................... 128/202.13

*Primary Examiner*—Ronald B. Cox
*Attorney, Agent, or Firm*—W. Britton Moore

[57] ABSTRACT

Firemen and other rescue workers customarily use various portable rescue equipment, such as, saws, or prying tools, and air evacuation or exhaust fans powered by internal combustion motors. As a lack of atmospheric air or a reduction to levels not supporting internal combustion affects the proper functioning of such motors, atmospheric air is excluded from the carburetors thereof by an air exclusion hood means attached thereto or associated therewith, and air from an air pack worn by the worker or other suitable remotely located source of compressed air is introduced thereinto through a line from such source to a demand type regulator valve as such fresh air is demanded or required by the motor. Thus, a supply of uncontaminated air from the air pack or remote source may be fed into the demand regulator valve and, thence, into the carburetor to fulfill the requirements of the motor and to insure the proper functioning thereof.

17 Claims, 14 Drawing Figures

ATMOSPHERE EXCLUSION HOOD MEANS FOR INTERNAL COMBUSTION MOTORS OF PORTABLE RESCUE TOOLS AND RELATED EQUIPMENT AND THE LIKE

This is a continuation-in-part of Ser. No. 070,359, filed Aug. 28, 1979, now abandoned.

BRIEF SUMMARY OF THE INVENTION

This invention relates to an atmosphere exclusion hood means for association with the carburetors of the internal combustion motors of portable rescue tools and related equipment and the like employed in rescue work and whereby contaminated air may be excluded from the motors and uncontaminated air from a source of compressed air directed to demand regulator valve means and thence into the hood and carberetor, as demand therefor is required, to insure proper functioning of the motor and rescue equipment.

CROSS REFERENCE TO PRIOR ART

While it is common to prime and start diesel and internal combustion engines, such as those of U.S. Pat. No. 2,945,483 to Howell, U.S. Pat. No. 3,187,735 Fiedler, U.S. Pat. No. 3,190,277 Tessier, U.S. Pat. No. 3,205,882 Fiedler, U.S. Pat. No. 3,379,185 Frisch, and U.S. Pat. No. 3,414,236 Reichenbach, air support devices, for firemen and the like, represented by U.S. Pat. No. 1,040,311 to Halloran, U.S. Pat. No. 1,004,291 French, and USSR Pat. No. 283,833, and the air intake assembly device of U.S. Pat. No. 4,215,665 to Stambaugh, such devices are not adaptable for excluding atmospheric air from the carburetor and insuring that uncontaminated air from a portable air cylinder means or other suitably arranged source of compressed air is introduced thereinto through demand regulator valve means, as the need therefor is required, to insure the continued proper and efficient functioning of internal combustion engine powered portable rescue tools and related rescue equipment and the like.

SUMMARY OF THE INVENTION

The principal object of the present invention is to provide an atmosphere exclusion hood means attachable to the carburetor of the internal combustion motors of portable rescue tools and the like used in fire fighting and other rescue work, such as, rescue saws, wedging or prying type tools, and air evacuation or exhaust fans, and line connected to back worn air pack cylinder means, or suitable remotely located sources of compressed air, so that uncontaminated air may be introduced into demand regulator valve means and, thence, as the demand therefor is required, into the carburetor to insure the proper functioning of the motor and rescue equipment.

Another object is the provision of an atmosphere exclusion hood means for attachment to a carburetor of an internal combustion motor operated rescue tool and-/or related equipment and having a series of spaced air openings circumferentially therearound to introduce atmospheric air thereinto, but which may be closed and the hood means sealed when smoke and toxic gases or lack of oxygen impede the proper functioning of the motor so that uncontaminated air from a portable air pack cylinder means or other source of compressed air may be directed into a demand regulator valve means and, thence, into the carburetor, as demand therefor is required, to insure continued normal operation of the motor and rescue equipment.

A further object is to provide an atmosphere exclusion hood means wherein one embodiment thereof is attachable to the carburetor of an internal combustion motor operated power rescue saw or wedging and prying tool, which hood means is in two parts with the botton or base part being connected by lines to a demand regulator valve housing and, thence, to a portable air pack cylinder, and the top or cap part including an interior section sleeved within an exterior section, with the two sections being alignably apertured so that, with the apertures open, atmospheric air may flow thereinto, but, when the sections are relatively rotated and the apertures misaligned, the top section will be sealed and, upon demand controlled by the demand regulator valve, only unadulterated air from the air pack cylinder will flow thereinto and, thence, to the carburetor to insure efficient functioning of the motor and tool.

Still another object is the provision of an atmosphere exclusion hood means including another embodiment thereof wherein the base part of the two part hood means is connected by lines to a demand regulator valve housing and, thence, to a remotely located source of compressed air, e.g. the air brake system or compressor of a mobile fire fighting or rescue truck, so that the hood means may be sealed against atmospheric air flowing thereinto and, thence, to the carburetor, and, upon demand controlled by the demand regulator valve, only unadultered air from the source of compressed air will flow thereinto and, thence, to the carburetor to insure efficient functioning of the motor and tool.

A further object is to provide an atmosphere exclusion hood means embodying an upper openable cap section into which atmospheric air may flow, and a lower sealable base section for receiving air, upon demand when needed and controlled by a demand regulator valve, from a suitable source of compressed air, with the hood means being attachable to the carburetor of an internal combustion motor of a portable rescue tool, such as, a powered saw, or wedging or prying tool, or air evacuation or exhaust fan, so that normally atmospheric air enters the upper cap section to flow to the carburetor, but, when such air is smoke filled and/or toxic, the upper cap section may be sealed to enable only the introduction of pure air, upon demand controlled by the demand regulator valve, from the source of compressed air, into the lower base section and carburetor.

A still further object is the provision of an atmosphere exclusion hood means adaptable for mounting on a portable internal combustion motor powered rescue saw carried by a rescue worker and so interconnected with a portable back worn air pack cylinder, or cylinders, which also may be strapped to a rescue worker, that, in the absence of smoke and toxic fumes, atmospheric air may flow into the hood means, but, when smoke and toxic fumes or a lack or oxygen are encountered, the hood means may be sealed to exclude atmospheric air therefrom and cause unadulterated air from the air pack cylinder or cylinders to flow, upon demand controlled by a demand regulator valve, into the hood means and, thence, to the carburetor to insure the proper functioning of the latter.

Still a further object is to provide an atmospheric exclusion blood means adapted to be arranged adjacent the carburetor of a separate internal combustion motor for powering a portable wedging or prying tool carried by a rescue worker and interconnected with a portable back worn air pack cylinder or cylinders also strapped to a rescue worker, so that the hood may be controlled by a rescue worker to either direct atmospheric air thereinto and to the carburetor, or seal the hood means and cause unadulterated air from the air pack cylinder or cylinders to flow through a demand regulator valve into the blood means and, thence, into the carburetor as demand therefor is required.

Another object is the provision of a relatively simple and inexpensive atmosphere exclusion hood means for ready assembly relative to the carburetor of portable internal combustion motor powered rescue equipment and air evacuation or exhaust fans to selectively admit atmospheric air thereinto, or, when sealed and as the demand therefor controlled by a demand regulator valve requires, introduce unadulterated air from a portable back worn air pack cylinder or cylinders, or other suitable remotely located source of compressed air thereinto to insure the proper functioning of the motor and rescue equipment.

These and other objects and advantages will be apparent as the specification is considered with the accompanying drawings, wherein FIG. 1 is a perspective view of a portable internal combustion motor powered rescue saw with atmosphere exclusion hood means assembled relative to the carburetor thereof, and a portable air pack cylinder and separate demand regulator valve means therefor, with the air pack and regulator valve means having straps for attachment to a rescue worker;

FIG. 1A is a perspective view of the embodiment of FIG. 1, but showing dual portable air pack harness back mounted cylinders with control valves on the outlet ends thereof, with the cylinders being hose connected to a demand regulator valve housing mounted on the saw and thence by hose to the air exclusion hood means, with a further embodiment thereof shown in dotted lines, substituting for the air pack cylinders a conduit from the demand regulator valve to a source of compressed air on a mobile fire truck or rescue vehicle;

Figure 1:
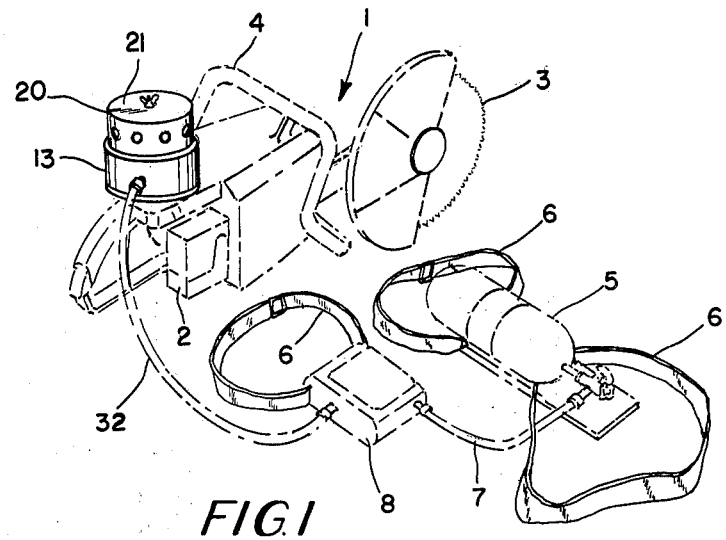
Figure 2:
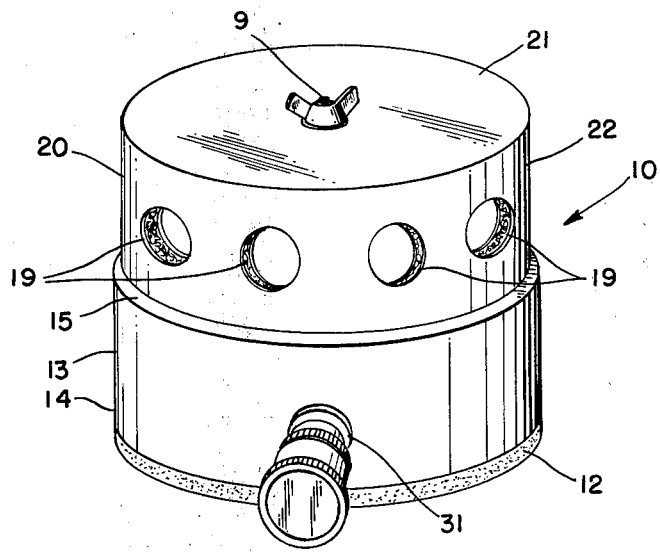
FIG. 2 is a perspective view of a detached two section cylindrical atmosphere exclusion hood for attachment to the rescue tool of FIG. 1, with the apertures thereof open to permit the entry of atmospheric air thereinto.
Figure 3:
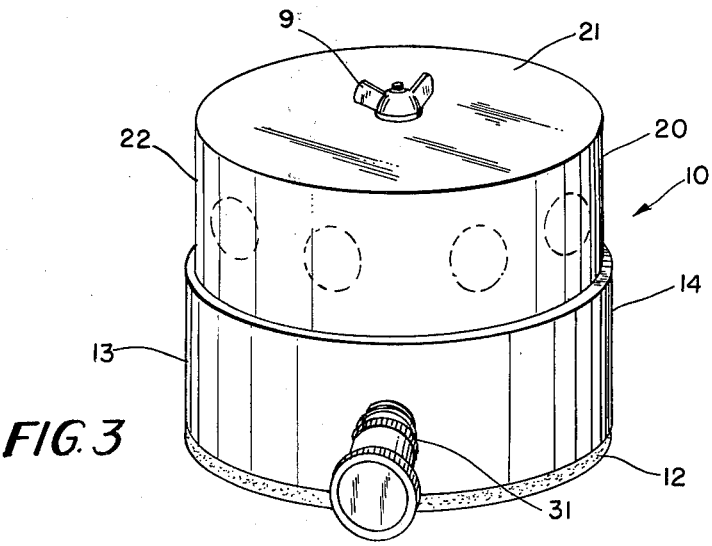
FIG. 3 is a perspective view, similar to FIG. 2, with the apertures closed to seal the hood during the entry of air from the air pack thereinto.
Figure 1A:
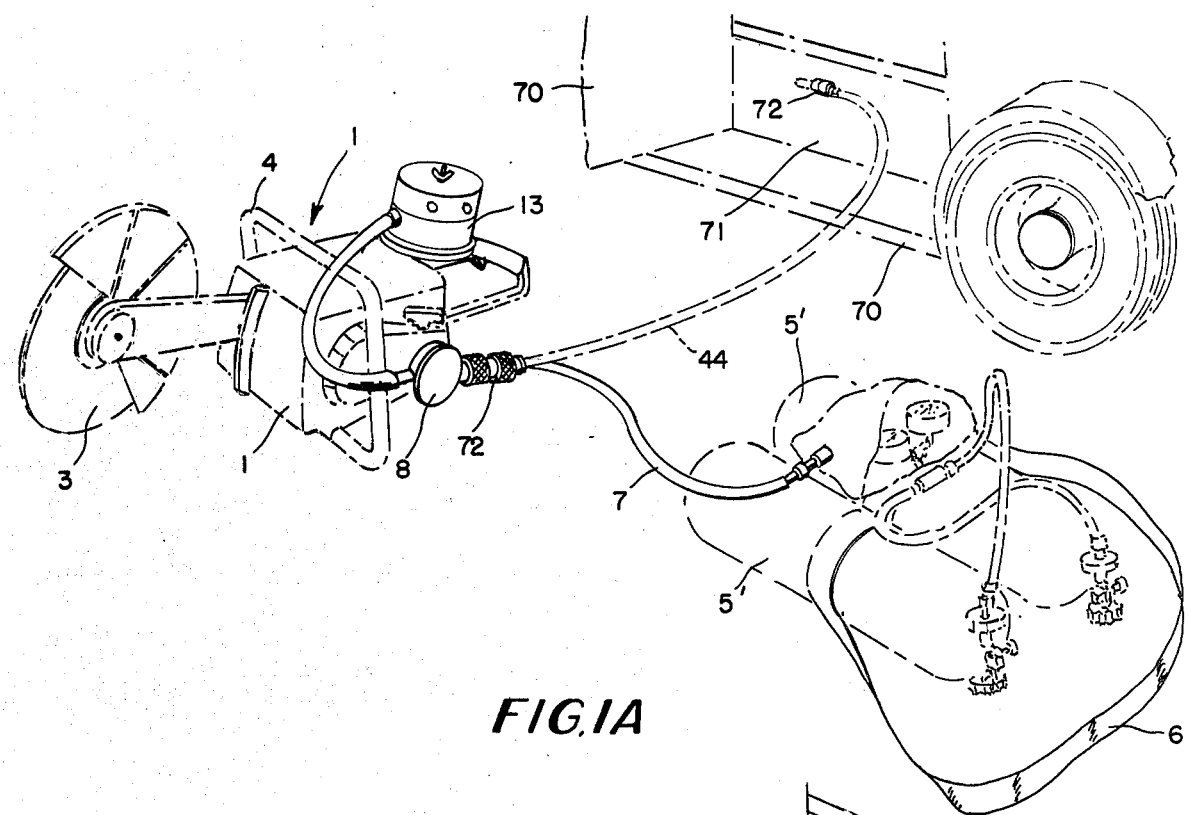
Figure 6A:
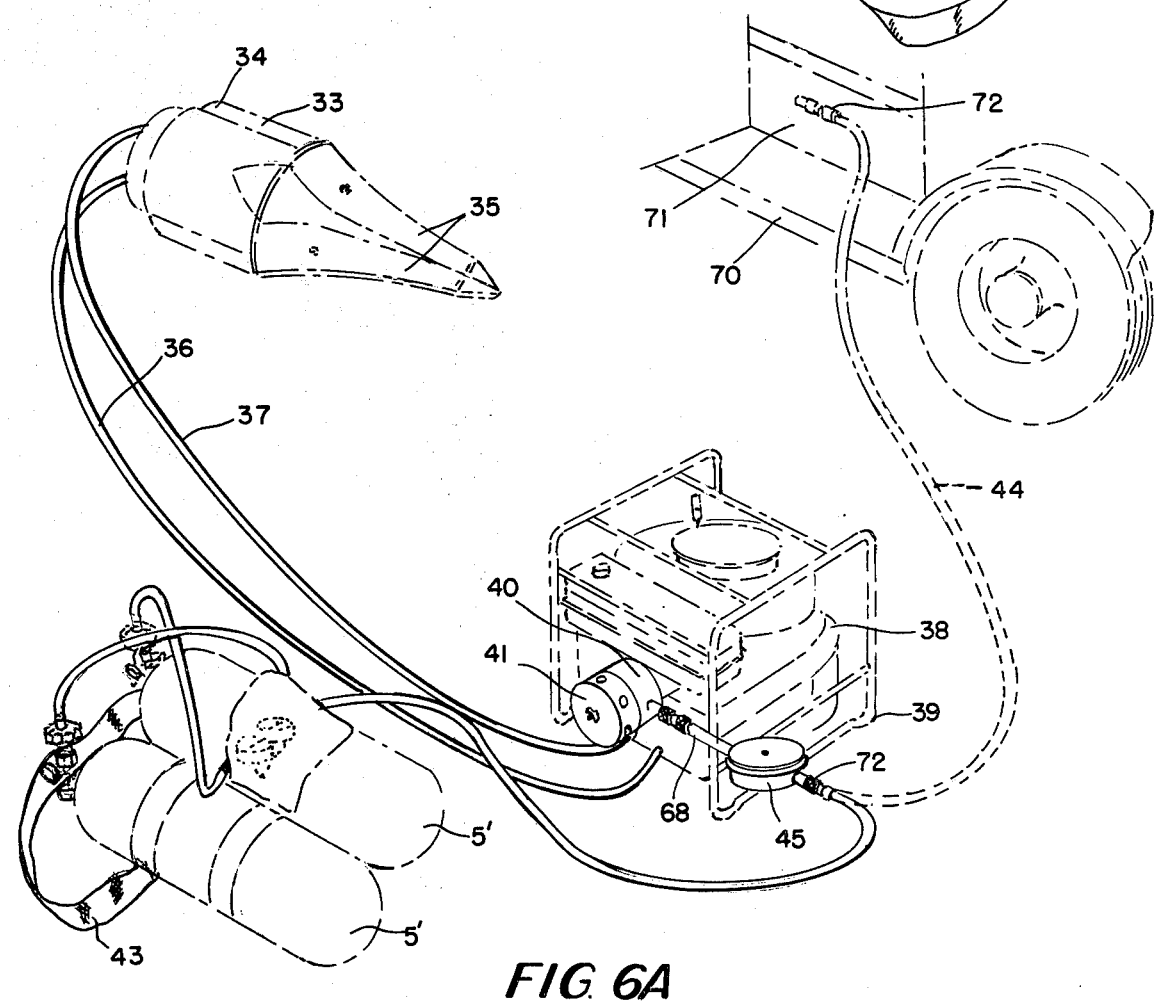
Figure 6:
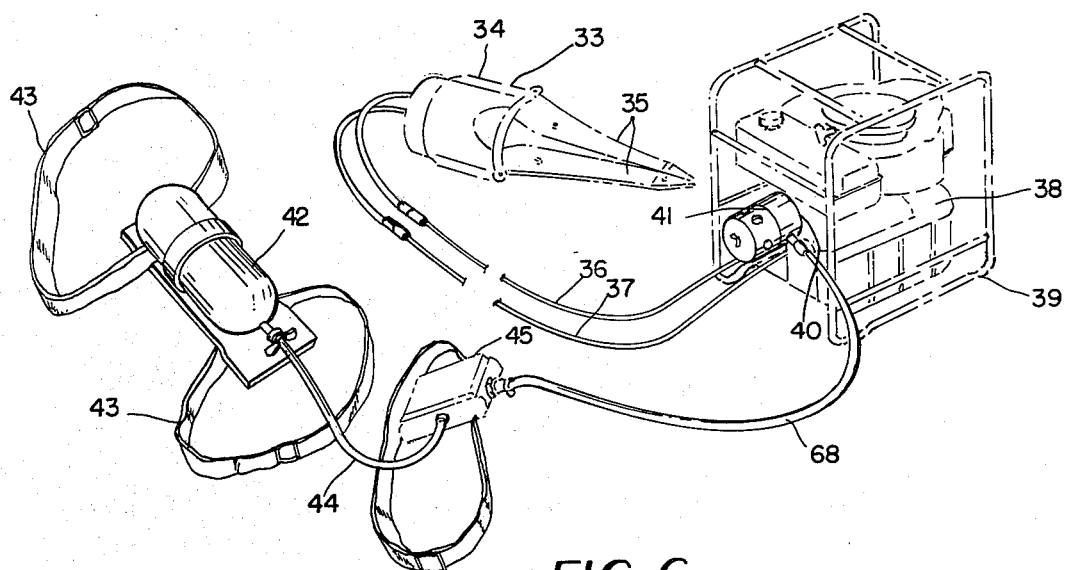
Figures 7, 8:
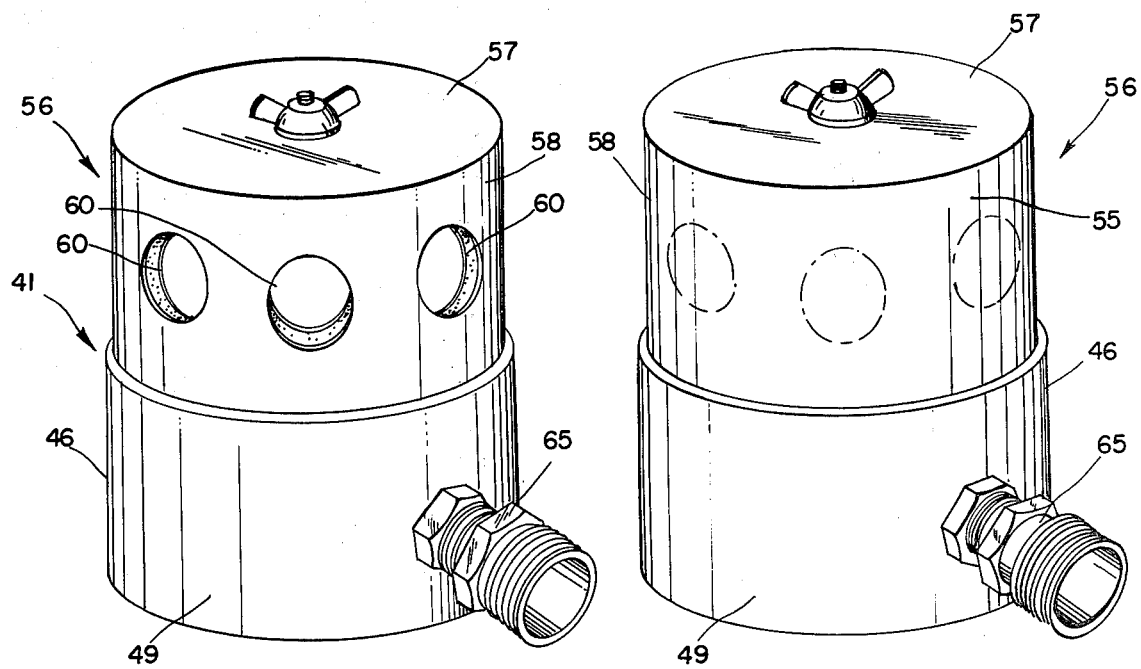
Figure 9:
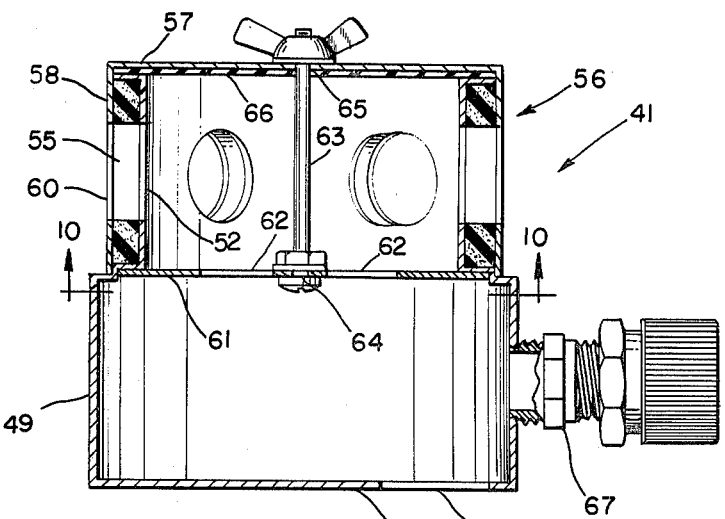
Figure 10:
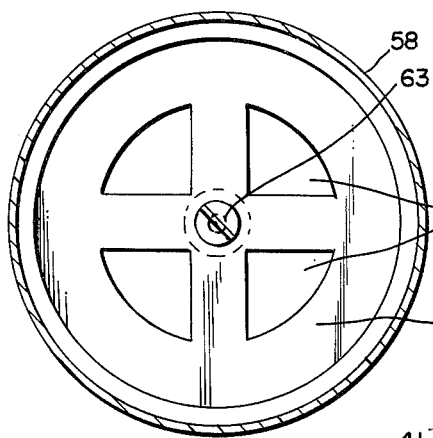
Figure 11:
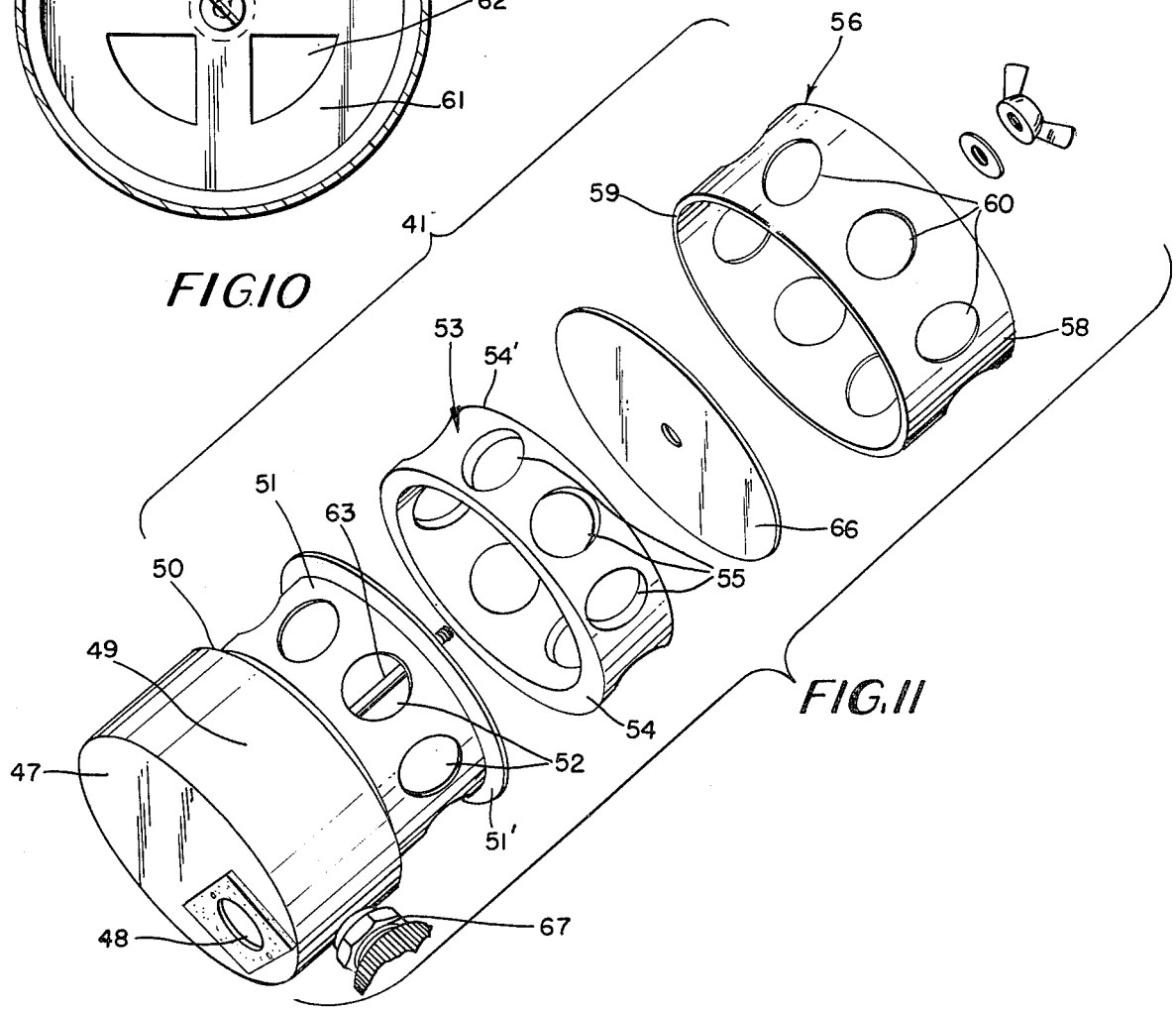
Figure 12A:
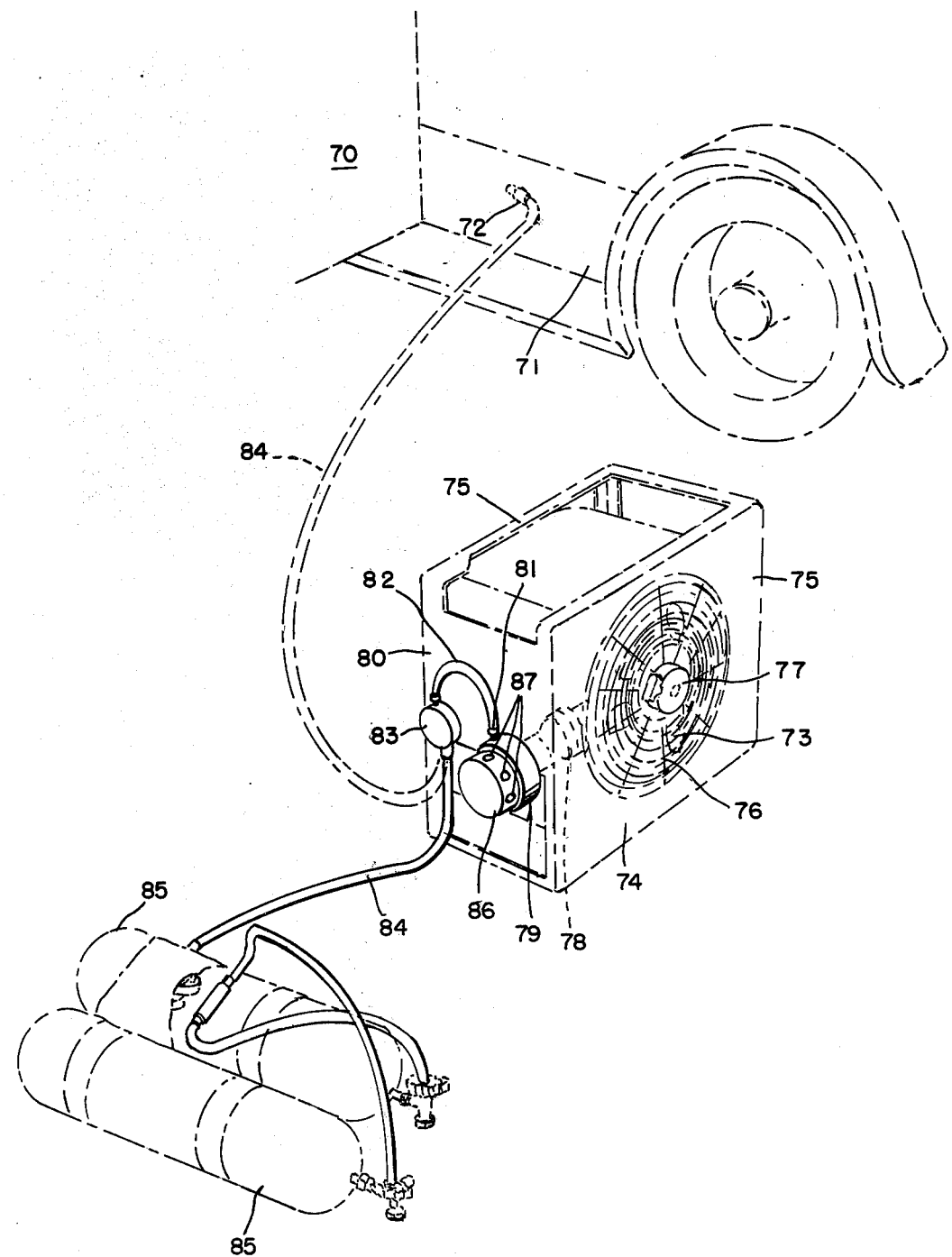

FIG. 6 is a perspective view of a portable rescue worker carried powered wedging or prying tool with separate stand supported internal combustion motor having an atmosphere exclusion hood assembled relative to the carburetor thereof, and a portable air pack cylinder and separate demand regulator valve means therefor, with the air pack and regulator valve means having straps for attachment to a rescue worker;

FIG. 6A is a perspective view of the embodiment of FIG. 6, but showing dual portable air pack harness back mounted cylinders with control valves on the outlet ends thereof, with the cylinders being hose connected to a demand regulator valve housing mounted on the wedging or prying tool motor stand and thence by hose to the air exclusion hood means, with a further embodiment thereof shown in dotted lines substituting for the air pack cylinders a conduit from the demand regulator valve to a source of compressed air on a mobile fire truck or rescue vehicle;

FIG. 7 is a perspective view of a detached two section cylindrical atmosphere exclusion hood for attachment to the rescue tool of FIG. 6, with the apertures thereof open to permit the entry of atmospheric air thereinto;

FIG. 8 is a perspective view, similar to FIG. 7, with the aperture closed to seal the hood during the entry of air from the air pack thereinto;

FIG. 9 is a cross section through the hood of FIG. 7;

FIG. 10 is a section on the line 10—10 of FIG. 9;

FIG. 11 is an exploded view showing the component parts of the hood of FIGS. 6-10; and FIGS. 12A is a perspective view of a portable internal combustion motor powered air evacuation or exhaust fan of the type used in fire fighting and rescue operations and arranged in a mounting stand for extracting smoke and toxic fumes from the area involved, and showing air openable and sealable hood means associated with the carburetor thereof, which is line connected to a demand regulator valve housing mounted on the stand and, in turn, connected by a line to either a single back mounted air pack cylinder of the type shown in FIG. 1, or the dual air pack cylinder arrangement of FIGS. 1A and 6A, or to a remote source of compressed air, such as shown in FIGS. 1A and 6A.

DETAILED DESCRIPTION

Referring more particularly to the drawings, wherein similar reference characters designate like parts throughout the several views, and first considering the embodiment illustrated in FIGS. 1-5, wherein the invention hereof is arranged on and used with an internal combustion motor powered hand carried rescue saw 1, of a conventional type generally and widely used by rescue workers, such as, firemen and the like, in fire and rescue work where the removal or separation of structural members is required to effect the release of trapped personnel and access to and within structures. A rescue saw of this type usually includes an elongated frame or housing 2 having a suitable and conventional two cycle internal combustion motor or the like, not shown, mounted therein, with the usual conventional carburetor, also not shown, associated therewith. Arranged on the outer end of conventional driving means, and actuated in the usual manner by the motor, is a rotatably supported cutting saw 3. The rescue saw is provided with the usual hand held grip 4 which enables the user to handle and manipulate the saw as required. It is to be understood that various other types of portable powered rescue equipment, such as representative examples thereof presently to be described, such as chain saws with carbide cutters or blades and driving chains or belts, not shown, and the wedging or prying tool (FIGS. 6-6A) and the air evacuation or exhaust fan (FIG. 12), are customarily employed in this type of rescue work, so that when such equipment is powered by internal combustion motors having carburetors, the air exclusion hood means hereof is adaptable for use therewith. However, except that the hood is attached thereto and used therewith, the powered rescue tool and/or associated equipment does not constitute a part of this invention.

As rescue workers are required to work in heavy smoke having toxic fumes, or in oxygen deficient atmospheres, it is customary to equip them with conventional life support equipment, including face mask type respirators, not shown, usually furnished with air from back worn air pack cylinders. However, it is to be understood that such life support systems are separate and distinct from and do not relate to the powered equipment with which the present invention is adapted to be used. When using this type of rescue equipment, it is customary to equip the rescue worker with either a single portable air pack cylinder 5 (FIG. 1) or the dual parallely arranged and disposed portable cylinders $5^1$ (FIG. 1A) strapped on the wearer's back by suitable harness mounting straps 6. Each of cylinders 5-$5^1$ is connected at a valve controlled end by a flexible hose conduit 7 to the inlet end 8Hu 1 of a conventional demand regulator valve housing 8, which, in the embodiments of FIGS. 1 and 6, may be harness attached to the worker, or suitably fixedly attached to and mounted on the powered tool or equipment, as shown in FIGS. 6A and 12. It is to be understood that the air pack cylinders, and associated demand regulator valve units are conventional and constitute equipment with which rescue workers are customarily equipped, so that no claim is made to these units per se.

It is, of course, necessary that carburetors of internal combustion engines receive atmospheric air through the inlets thereof to enable efficient operation. As rescue equipment of the type herein described is usually operated under conditions which preclude the entry of uncontaminated air into the carburetors thereof, it follows that the engines tend to stall and operate sporadically and inefficiently because of deficient oxygen, or smoke and toxic fumes. This impedes and impairs the operation of the equipment, with incident danger to personnel.

With the foregoing in mind, it is usually customary to mount an air filter relative to the inlet end of the carburetor by a bolt and wing nut assembly 9 extending therethrough to retain the usual top or lid thereon. However, as the present hood assembly 10 takes the place of an air filter, the latter is removed and discarded so that the open lower end 11 of a cylindrical hood, of any suitable material, such as metal or plastic, is fitted on the top rim of the air filter mount with a suitable gasket 12 interposed therebetween. The hood 10 includes a main base body section 13 having a side wall 14, which is bent and inset inwardly, intermediate its ends, as at 15, to provide an offset annular flange 16, so that the upper wall section 18 thereabove is planarly inset with reference to side wall 14. A circumferential row of spaced apertures 19 is formed in the inset upper wall section 18. A cylindrical cap 20, also of suitable metal or plastic, and closed at its upper end by a flat wall 21 and formed with a depending annular wall 22, fits over the upper wall section 18 so that the lower rim 23 of cap wall 21 rests on and is supported by the annular flange 16 of wall section 18. A circumferential row of spaced apertures 24 is also formed in cap wall 22, intermediate its upper and lower edges.

Fixedly arranged within and forming a part of the main hood base body section 13 is a sleeve 25 of neoprene or other stretchable foam plastic material having its lower rim 26 abutting the annular flange 16 of upper wall section 18. The foam plastic sleeve 25 has a circumferential row of spaced apertures $25^1$ formed therein, and the sleeve is stretchable over the upper wall section 18 so that its interior wall 26 sealingly and frictionally engages therewith and the apertures $25^1$ are aligned with the row of spaced apertures 19 in wall section 18. When so positioned, the sleeve 25 will be interposed on the wall section 18 between flange 16 and an outwardly extending annular rim $18^1$ at the upper terminus of wall 18. Thus, upon manual rotation of cap 20, relative to the reduced upper end of the main hood body and the stretchable sleeve 25 thereon, the cap apertures 24 are aligned with the apertures $25^1$ and 19 in the sleeve 25 and hood wall section 18, so that air may enter therethrough in the hood interior. Conversely, when the apertures are misaligned, the hood will be sealed against the entry of atmospheric air.

Figure 4:
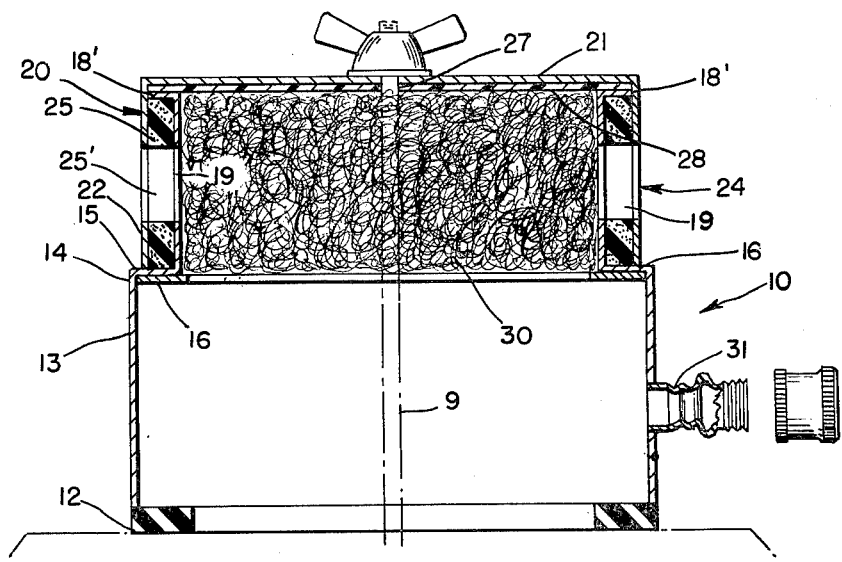
FIG. 4 is a cross section through the hood of FIG. 2.
Figure 5:
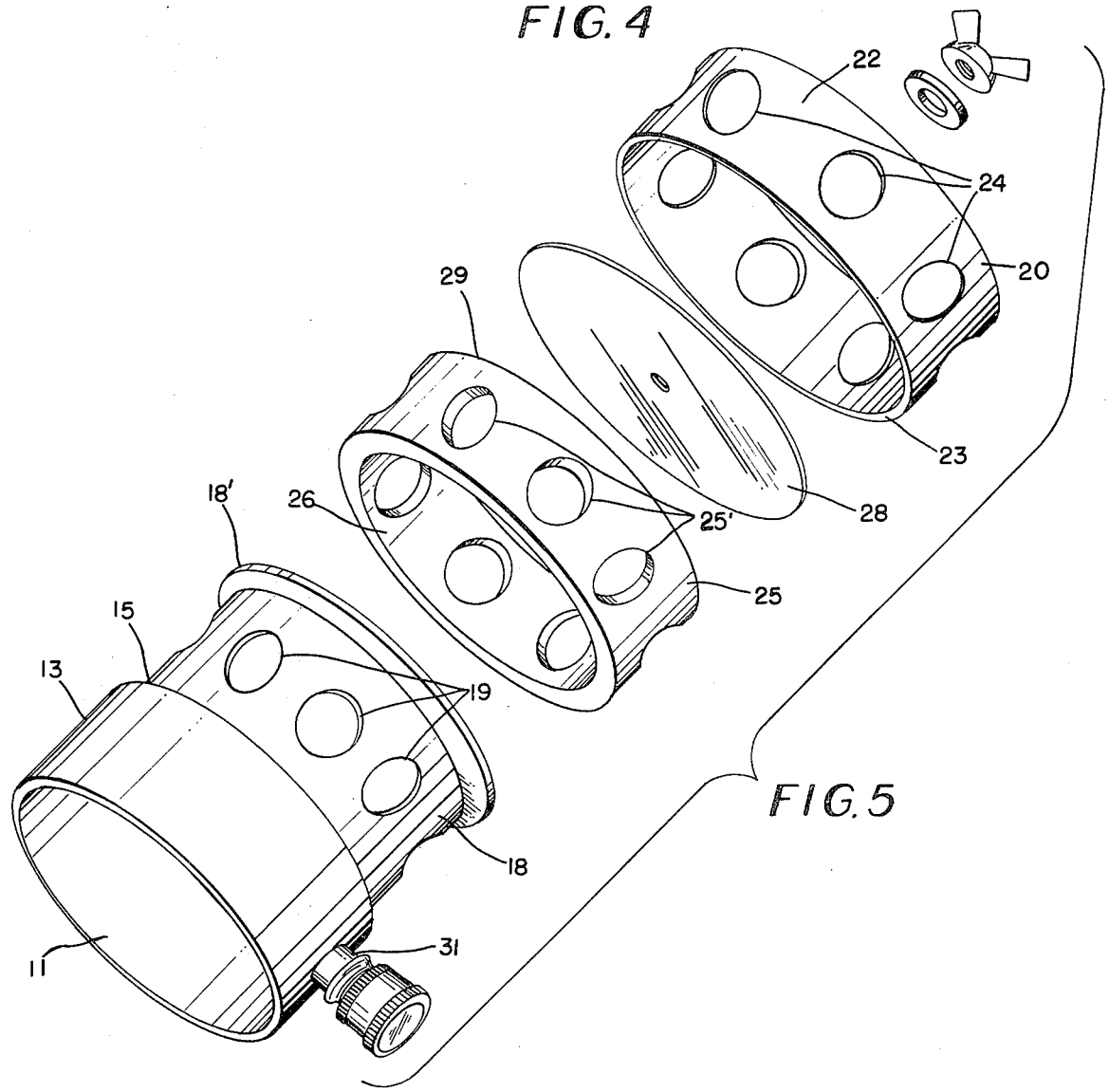
FIG. 5 is an exploded view showing the component parts of the hood of FIGS. 1-4.

The cap 20 and main hood body section 13 are retained assembled relative to the carburetor by virtue of the air filter assembly bolt 9 extending upwardly through a central aperture 27 in the flat cap top wall 21, with the wing nut being screwed on the upper end thereof. In this connection, if deemed desirable, a centrally apertured flat gasket 28 may be interposed between the top of the annular rim $18^1$ and the underside of top cap wall 21 for added sealing purposes. In addition, a suitable filtering packing material 30, as shown in FIG. 4, may be housed within the reduced upper end of the main hood body section so as to filter air entering through the wall apertures thereof.

Opening into the side wall 14 of hood main body section 13 and projecting laterally therefrom is an extremely threaded fitting 31, which is adapted to be coupled to an end of a flexible hose 32 having its outer end connected to the suction end of the demand regulator valve housing 8, in turn having its inlet or high pressure end connected by hose conduit 7 with an air pack cylinder 5. Thus, when the rescue tool is being used under unfavorable conditions with smoke and toxic fumes, or a lack of oxygen, when such adulterated air entering the carburetor will impair the operating efficiency of the motor and rescue equipment, the cap 20 is manually rotated, as previously described, to close the apertures thereof and seal the hood against the entry of atmospheric air. When so sealed, the valve on the end of air pack cylinder 5 is opened to release high pressure air therefrom and through conduit 7 into the inlet or high pressure end of the demand regulator valve housing 8.

Although it is to be understood that demand regulator valves of the type herein used are conventional they serve to control the flow of air into the air exclusion hood and carburetor, as the demand therefor is required. As high pressure air from an air pack cylinder or other source of compressed air is fed into the inlet or high pressure end of the demand regulator valve housing, the usual diaphragm means, not shown, associated with the suction outlet thereof functions to release air from the valve housing, as demand therefor is required, depending upon vacuum created in the carburetor. It will be apparent that the diaphragm means released varying amounts of air, depending upon the requirments of the motor, so that at lower R.P.M. less air is released and at higher R.P.M. more air will be released.

By reference to FIGS. 6 to 11, it will be evident that the present atmosphere exclusion hood is also adaptable for use with other internal combustion engine powered rescue equipment, such as the hydraulically actuated portable wedging or prying tool 33, of the type shown in FIG. 6. Such a tool 33 includes a portable hand carried housing 34 having a pair of elongated tapered jaws 35 pivotally mounted thereon for wedging or prying apart metal objects. Fluid is introduced to the housing 34 through flexible intake and return hoses 36 and 37 from a conventional internal combustion engine 38, mounted on and supported by a suitable floor mounted stand 39. Engine 38 includes the usual carburetor 40 upon the outer inlet end of which is suitably bolted or otherwise suitably attached the main body section of a cylindrical hood 41, of any suitable material such as metal or plastic, generally approximating that of the hood 10 of FIGS. 1–5. As with the previous embodiment, rescue tool 33 and its associated stand mounted internal combustion engine 38 are conventional, and no claim is made thereto, except that the present atmosphere exclusion hood is mounted on or associated with the carburetor thereof and is used in conjunction therewith to insure the continued efficient operation thereof. It will also be understood that this embodiment of rescue tool is hand carried and operated by a rescue worker equipped with a conventional portable metal air pack cylinder 42, mounted by harness straps 43 on the wearer's back. The valve end of cylinder 42 is connected by flexible hose 44 to the inlet or high pressure end of a conventional demand regulator valve housing 45, generally corresponding to that of FIG. 1, which may be harness attached to the worker and by which, as previously described, air may be released from the suction end of the valve housing and caused to flow to the hood and carburetor, as the demand therefor is required. As hereinbefore described, such a demand regulator valve is conventional and is combined and so associated with the air pack cylinder and air exclusion hood to furnish unadulterated air to the hood and carburetor, as the demand therefor is needed.

Hood 41 is cylindrical and includes a main body section 46 having a flat bottom wall 47, with an opening 48 therein which is positioned over the inlet opening, not shown, of the carburetor 40, when attached thereto or associated therewith. Thus, atmospheric air introduced into the hood may enter the carburetor, in an obvious manner. The side wall 49 of hood section 46 is bent and inset inwardly, as at 50, intermediate its ends, so that the uppermost section 51 of wall 49 thereabove is planarly inset with reference to the lower section. A circumferential row of spaced apertures 52 is formed in the inset upper wall section 51. A sleeve 53 of neoprene or foam plastic material is stretched over and frictionally sealingly engages upper wall section 51 to form a part thereof, with the lower rim 54 of sleeve 53 abutting inset 50 of the wall section, and the upper rim $54^1$ thereof engages the underside of an outwardly extending annular rim $51^1$ at the upper terminus of wall section 51. A circumferential row of spaced apertures 55 is formed in sleeve 53 which are aligned with the apertures 52 in the upper wall section 51 of the main hood body section. A cylindrical cap 56, of suitable material such as metal or plastic, closed at its upper end by a flat wall 57 and formed with a depending annular wall 58, fits over the sleeve 53 and upper wall section 51 so that the lower rim 59 rests on and is supported by wall inset 50. A circumferential row of spaced apertures 60 is also formed in cap wall 58, and are alignable with the apertures 55 and 52 in the sleeve and hood wall 51.

From the foregoing, it will be apparent that manual rotation of cap 56, relative to sleeve 53 and the main hood body, causes the cap apertures 60 to be aligned with sleeve and hood wall apertures 55 and 52 so that atmospheric air enters therethrough into the hood section. Misalignment of the apertures will, of course, block the same against the entry of air and seal the hood. A flat metal spider 61, having four radial openings 62, is disposed at the upper end of the main hood section 46 and engages with the underside of wall inset 50. A threaded bolt 63, projecting upwardly through central apertures 64 and 65 in spider 61 and cap top wall 57, serves to retain the hood and cap assembled. If desired, a centrally apertured flat gasket 66 may be interposed between the upper rim $54^1$ of sleeve 53 and the underside of top wall 57 for added sealing purposes, in which event, the bolt 63 will also project therethrough.

As with the embodiment of FIGS. 1–5, a fitting 67 opens into side wall 49 of the main hood section 46 and projects laterally therefrom for coupling to an end of a flexible hose 68, which is connected, at its other end, to the suction end of demand regulator valve housing 45. Accordingly, when the tool is operated in heavy smoke and toxic fumes, or in oxygen deficient atmospheres, so that air entering into the hood will impair the proper functioning of the motor and rescue tool, the cap apertures may be closed by rotation of the cap to seal the hood and prevent the entry of adulterated air thereinto. The demand regulator valve 45 will then function to release compressed air through the suction outlet thereof which will flow through hose 68 into the hood 41 and therefrom through opening 48 in the bottom wall thereof and into the carburetor, as the demand therefor is needed, in an obvious manner, and as previously described.

It is to be understood that it may be desirable to relieve the rescue worker of the added weight and burden of carrying the single back mounted air pack cylinders of FIGS. 1 and 6, or the dual air pack cylinders of FIGS. 1A and 6A, in which event the air pack cylinders may be omitted and the demand regulator valves 8 and 45 connected directly to other suitable remotely located sources of compressed air. For example, as shown in dotted lins in FIGS. 1A and 6A, the single or dual air pack cylinders 5-$5^1$ may be omitted, and the hose conduits 7 of FIGS. 1–1A, or the hose conduits 44 of FIGS. 6–6A, increased to a length sufficient to extend to and reach a mobile fire truck or rescue vehicle 70 located remotely from the rescue worker. This type of mobile equipment 70 is usually equipped with sources of compressed air, which may be located, for example, in a compartment 71. Suitable fast disconnect couplings 72 may be provided on the outer end of the hose conduits to enable removable attachment to suitable outlet fittings, not shown, in the side wall of compartment 71. Thus, in such an arrangement, it will be apparent that unadjulterated compressed air will be supplied from the vehicle through conduits 7 or 44 to the demand regulator valves 8 and, thence, to the air exclusion hoods and carburetors.

In addition to the portable power rescue tools of FIGS. 1–6, the present air exclusion hood means may be used with other types of internal combustion motor powered rescue equipment which will not function efficiently when smoke, toxic fumes, and deficient oxygen are encountered. Such a further representative embodiment is shown in FIG. 12, wherein an air evacuation or exhaust fan 73 of conventional construction is arranged in and supported by a generally rectangular mounting frame 74 having protective grilles 76 arranged in openings in the opposing front and rear walls 75 thereof. This type of fan is powered in the usual manner by an internal combustion motor 77 including a carburetor 78.

An air exclusion hood means 79 of the type shown in FIGS. 9–11 is adapted to be utilized with the fan 73 of FIG. 12, and may be arranged on a side wall frame wall 80 so that the outlet opening in the flat bottom wall of the main hood body section is arranged over and suitably attached to the inlet opening in side wall 80 leading to the carburetor throat. Thus, atmospheric air introduced into the hood 79 through the alignable openings in the side walls thereof may pass through the outlet opening in the bottom wall thereof and enter the carburetor 78, in an obvious manner. The hood 79 is equipped with a side wall fitting 81 for coupling to an end of a flexible hose 82 connected at its outer end to the suction side of a demand regulator valve housing 83, which may also be suitably and fixedly attached to the side wall 80 of frame 74. The high pressure inlet side of the demand regulator valve housing 83 is connected by a flexible hose conduit 84 to a suitable source of compressed air, which may embody single or dual air pack cylinders 85, or a remotely located source of compressed air on a mobile fire truck and the like 70, such as previously referred to. Where air pack cylinders are used, they probably would be floor or stand mounted, rather than harness attached to a rescue worker.

Accordingly, when the fan is being operated in heavy smoke, toxic fumes, or where there is deficient oxygen, atmospheric air entering the hood will impair the proper functioning of the motor and fan, so the hood cap apertures 87, as described with the embodiments of FIGS. 1-11, may be closed by rotation of the cap 86 thereof to prevent the entry of atmospheric air therethrough. As previously described, the demand regulator valve 83 functions to release compressed air through its suction outlet which flows through hose 82 to the carburetor and motor, according to the demand and requirements thereof, and insure of the continued efficient functioning of this equipment.

While the embodiments of atmosphere exclusion hoods, and various arrangements thereof with different powered equipment, sources of compressed air, and demand regulator valves have been shown and described, it is to be understood that various other changes and improvements may be made therein without departing from the scope and spirit of the appended claims.

What I claim is:

1. The combination with a portable rescue device useable by a rescue worker in fire and other rescue work and powered by an internal combustion motor including a carburetor, and a source of compressed air associated with said device, demand regulator valve means associated with said device and having a high pressure inlet side and a suction outlet side, said high pressure side being connected by conduit means to said compressed air source, atmosphere exclusion hood means mounted adjacent to said carburetor, openable and closable apertures in said hood means for introducing atmospheric air thereinto and to said carburetor, said hood means being interconnected by conduit means to the suction outlet side of said demand regulator valve means whereby when smoke, toxic fumes or a deficiency of oxygen is encountered said apertures are closable to seal said hood means against the entry of atmospheric air, and said demand regulator valve means controls the release of unadulterated air through said suction outlet side and said conduit means to said hood means and thence into said carburetor as the demand therefor is required by said carburetor and motor for insuring continued efficient operation thereof.

2. The combination of claim 1, wherein said rescue device comprises a portable rescue worker carried saw, and said hood means is mounted adjacent to said carburetor.

3. The combination of claim 1, wherein said rescue device comprises a portable rescue worker carried wedging and prying tool including pivotal jaws, and said hood means is mounted adjacent to said carburetor.

4. The combination of claim 1, wherein said rescue device comprises an air evacuation and exhaust fan including a stand for portable mounting where rescue operations are being performed, and said hood means is mounted adjacent to said carburetor.

5. The combination of claim 2, wherein said source of compressed air comprises air pack cylinder means harness attached to the rescue worker, and said hood means is mounted adjacent to said carburetor.

6. The combination of claim 2, wherein said source of compressed air comprises a mobile rescue vehicle having compressed air means thereon, and said hood means is mounted adjacent to said carburetor.

7. The combination of claim 3, wherein said source of compressed air comprises air pack cylinder means harness attached to the rescue worker, and said hood means is mounted adjacent to said carburetor.

8. The combination of claim 3, wherein said source of compressed air comprises a mobile rescue vehicle having compressed air means thereon, and said hood means is mounted adjacent to said carburetor.

9. The combination of claim 4, wherein said source of compressed air comprises air pack cylinder means mountable generally adjacent to said fan, and said hood means is mounted adjacent to said carburetor.

10. The combination of claim 4, wherein said source of compressed air comprises a mobile rescue vehicle having compressed air means thereon, and said hood means is mounted adjacent to said carburetor.

11. The combination of claim 1, wherein said hood means is generally cylindrical with the upper end being closed and the lower end associated and communicating with said carburetor.

12. The combination of claim 11, wherein said apertures are spacedly formed in and extend circumferentially of the side wall of said hood means.

13. The combination of claim 12, wherein said hood means includes a main body portion and an upper cap portion sleeved over and rotatable relative thereto, spaced apertures formed in said cap portion alignable with said apertures in said main body portion whereby said apertures are openable to admit atmospheric air into and closed to seal said hood means against the entry of such air thereinto.

14. The combination of claim 13, wherein said conduit means from the suction outlet side of said demand regulator valve means is connected to the side wall of said main body portion below and spaced from said apertures whereby air emanating from said source of compressed air is released by said regulator valve means through said suction outlet side and into said hood means as the demand therefor is required by said carburetor and motor.

15. The combination of claim 12, wherein bolt means is projectable vertically through the lower end of said hood means and into and therethrough, and nut means mounted on said bolt means for interconnecting said hood means and carburetor.

16. The combination of claim 14, wherein said side wall is inset intermediate its ends to provide a reduced upper end with said apertures therein extending circumferentially thereof, resilient sleeve means sleeved over said reduced upper end and formed with apertures aligned with the apertures in said reduced upper end, and the apertures in said cap portion being alignable with the apertures in said sleeve means and said upper end, and said cap portion being rotatable relative to said sleeve means and said upper end, whereby when said apertures are aligned atmospheric air is introduced therethrough and into said hood means and thence to the carburetor, and when said apertures are misaligned and closed said hood means is sealed against the entry of atmospheric air thereinto, so that said demand regulator valve means will release unadulterated air emanating from said source of compressed air into said hood means and thence into said carburetor.

17. The combination of claim 3, wherein the main hood body portion of said hood means mounted on and associated with the carburetor of said wedging and prying tool is open and aligned with the inlet opening of said carburetor, and wherein the side wall of said main body portion is inset intermediate its ends to provide a reduced upper end with said apertures being formed therein and extending circumferentially therearound, a resilient sleeve means having spaced apertures extending circumferentially therearound, said sleeve means being sleeved over said upper end whereby said apertures are aligned, and said cap means having a closed upper end and being rotatable to align and misalign the apertures therein with the apertures in said sleeve means and upper end, spider means being arranged in said main hood body portion intermediate its ends, and bolt means extending through said spider means and the closed upper end of said cap means and said nut means is attached to said bolt means to interconnect said main hood body and cap means.

* * * * *